United States Patent [19]

McWaters et al.

[11] 4,408,344
[45] Oct. 4, 1983

[54] OCR AND BAR CODE READER USING MULTI PORT MATRIX ARRAY

[75] Inventors: Lynn D. McWaters, Garland; Medford D. Sanner, Irving, both of Tex.

[73] Assignee: Recognition Equipment Incorporated, Irving, Tex.

[21] Appl. No.: 252,554

[22] Filed: Apr. 9, 1981

[51] Int. Cl.³ .............................................. G06K 9/28
[52] U.S. Cl. ..................................... 382/62; 235/436; 235/440; 235/462; 382/68; 382/57
[58] Field of Search ................. 340/146.3 Z, 146.3 D, 340/146.3 SY, 146.3 C; 235/440, 454, 462, 463, 470, 472, 494; 250/566, 568-570, 578; 382/62, 68, 57

[56] References Cited

U.S. PATENT DOCUMENTS

| | | | |
|---|---|---|---|
| 3,033,449 | 5/1962 | Quinn et al. | 340/146.3 Z |
| 3,558,859 | 1/1971 | Dilsner et al. | 235/440 |
| 3,663,803 | 5/1972 | Mohan et al. | 235/463 |
| 3,870,865 | 3/1975 | Schneiderhan et al. | 235/454 |
| 3,902,049 | 8/1975 | Hanchett, Jr. | 235/462 |

*Primary Examiner*—Leo H. Boudreau
*Attorney, Agent, or Firm*—Richards, Harris & Medlock

[57] ABSTRACT

A common scanning unit is utilized in an optical character reader which reads both alphanumeric and bar code characters. An N column by M row area photosensor detects both the alphanumeric and bar code signals. The system detects which type of character is being read and then outputs the identity of the character.

2 Claims, 16 Drawing Figures

STANDARD SYMBOL SET

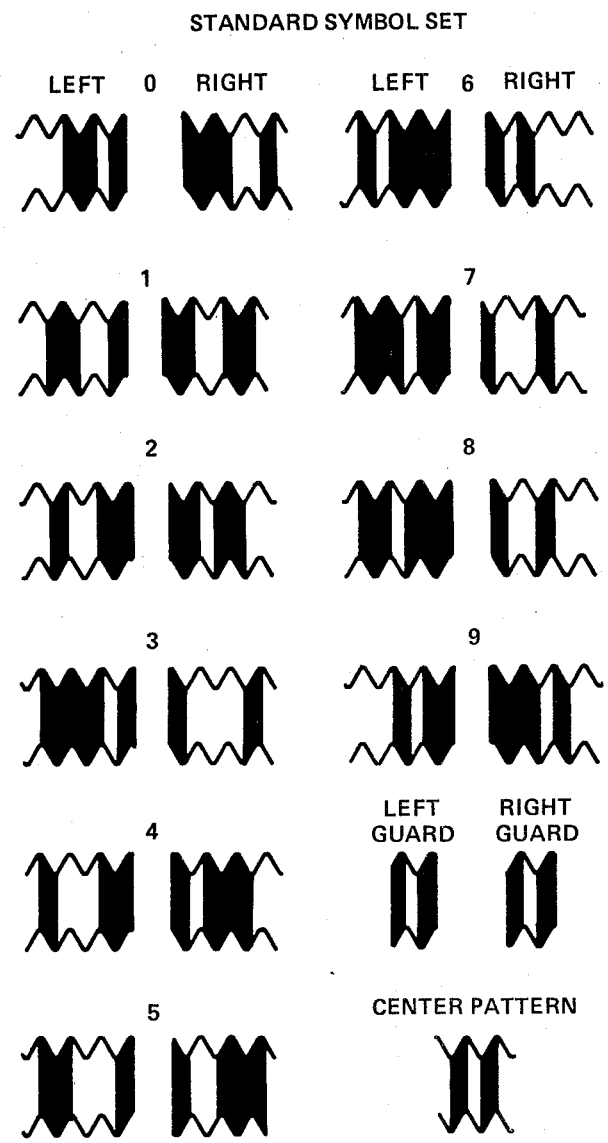

TABLE 1

E VERSION PARITY PATTERN
(THE CONDENSED SIX CHARACTERS OF VARYING PARITY BY ITS LOCATION)

| NO SYSTEM | MODULE CHECK CHAR VALUE | CHARACTER LOCATION NUMBER | | | | | |
|---|---|---|---|---|---|---|---|
| | | 1 | 2 | 3 | 4 | 5 | 6 |
| 0 | 0 | E | E | E | O | O | O |
| 0 | 1 | E | E | O | E | O | O |
| 0 | 2 | E | E | O | O | E | O |
| 0 | 3 | E | E | O | O | O | E |
| 0 | 4 | E | O | E | E | O | O |
| 0 | 5 | E | O | O | E | E | O |
| 0 | 6 | E | O | O | O | E | E |
| 0 | 7 | E | O | E | O | E | O |
| 0 | 8 | E | O | E | O | O | E |
| 0 | 9 | E | O | O | E | O | E |
| 1 | 0 | O | O | O | E | E | E |
| 1 | 1 | O | O | E | O | E | E |
| 1 | 2 | O | O | E | E | O | E |
| 1 | 3 | O | O | E | E | E | O |
| 1 | 4 | O | E | O | O | E | E |
| 1 | 5 | O | E | O | E | O | E |
| 1 | 6 | O | E | O | E | E | O |
| 1 | 7 | O | E | E | O | O | E |
| 1 | 8 | O | E | E | O | E | O |
| 1 | 9 | O | E | E | E | O | O |

TABLE 2

E VERSION CHARACTER ENCODATION
(THREE OF THE SIX CHARACTERS ARE CODED IN ODD PARITY AND THREE ARE CODED IN EVEN PARITY)

| CHARACTER VALUE | ODD PARITY | EVEN PARITY |
|---|---|---|
| 0 | 0001101 | 0100111 |
| 1 | 0011001 | 0110011 |
| 2 | 0010011 | 0011011 |
| 3 | 0111101 | 0100001 |
| 4 | 0100011 | 0011101 |
| 5 | 0110001 | 0111001 |
| 6 | 0101111 | 0000101 |
| 7 | 0111011 | 0010001 |
| 8 | 0110111 | 0001001 |
| 9 | 0001011 | 0010111 |

TABLE 3

OCR AND BAR CODE READER USING MULTI PORT MATRIX ARRAY

FIELD OF INNVENTION

This invention relates to optical character readers and more particularly to a hand held optical character reader for reading either alphanumeric or bar code format with the same hand held unit with no operator intervention to switch between the reading of the two formats.

PRIOR ART

Hand held optical readers are well known in the art and alphanumeric readers are described in U.S. Pat. No. 4,075,605 and 4,188,687. There are also many patents relating to hand held units for reading bar code particularly the universal product code (UPC), however there are no hand held readers which read both bar code format and alphanumeric format. With the increasing use of OCR coding in merchandising tags and inventory control it is desirable to have a hand held unit which will read either the bar code or the alphanumeric format without the operator having to switch the unit depending upon which code is to be read.

SUMMARY OF THE INVENTION

This invention relates to hand held optical readers which will read either bar code or alphanumeric font automatically without any switching by the operator. The data to be read is scanned with one or more columnar arrays. The array may be a single column or a multiple column. When the direction of reading is a criteria, then at least two columns will be utilized. With at least two column the array has parallel outputs which read out sequentially each of the picture elements from the column but in parallel with all other columns. The bar code signal is produced by selecting one of the column outputs. Several picture elements are selected near the center of the column. The output is from a column near the center of the array in order to reduce the effects of rolling the hand held reader and to obtain most optimum illumination. The bar code signal is derived from only a few of the vertical pixels so a reasonable amount of angular rotation of the sensor axis relative to the vertical of the bar code can be tolerated.

DRAWINGS

Figure 7A:
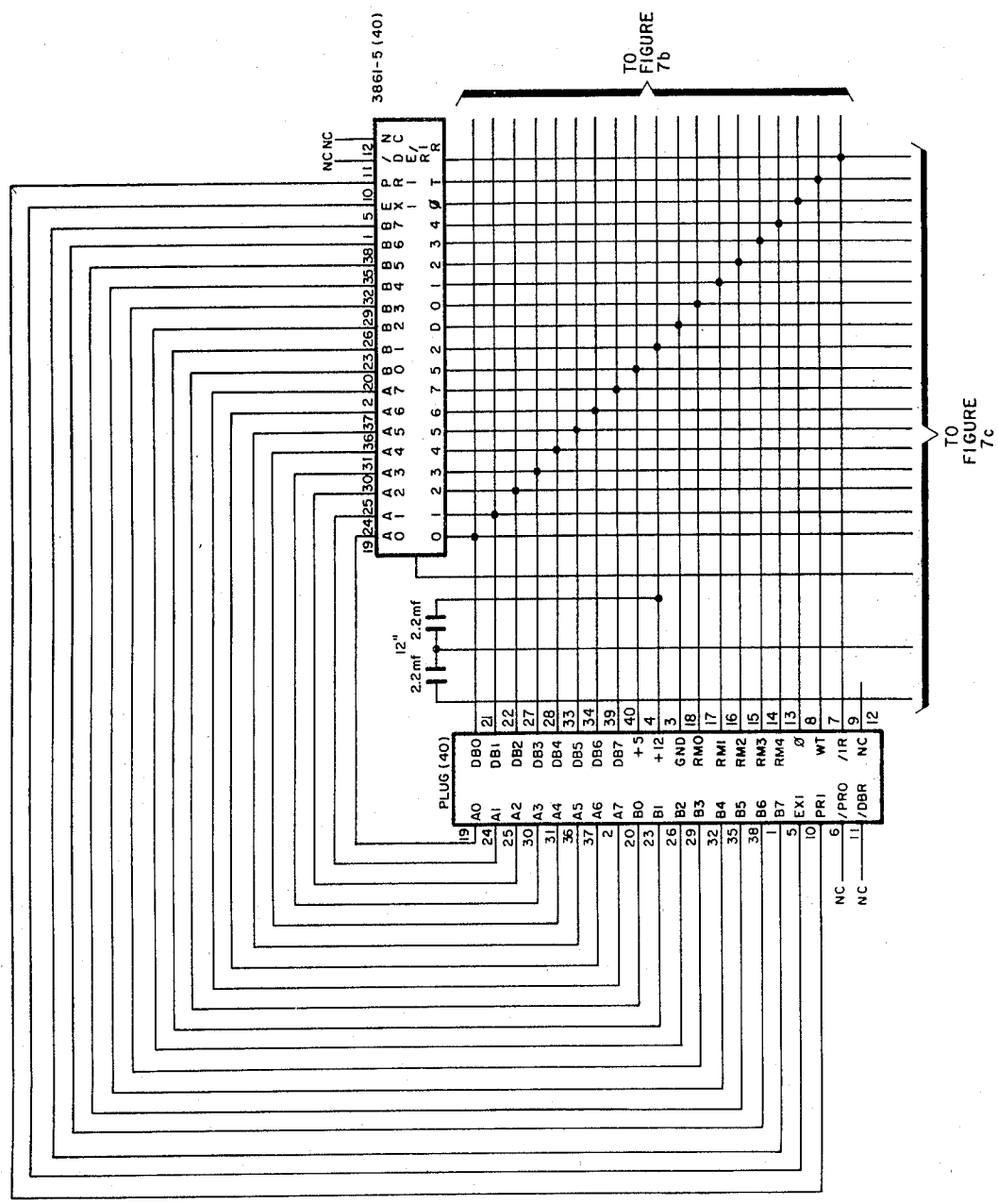
Figure 7B:
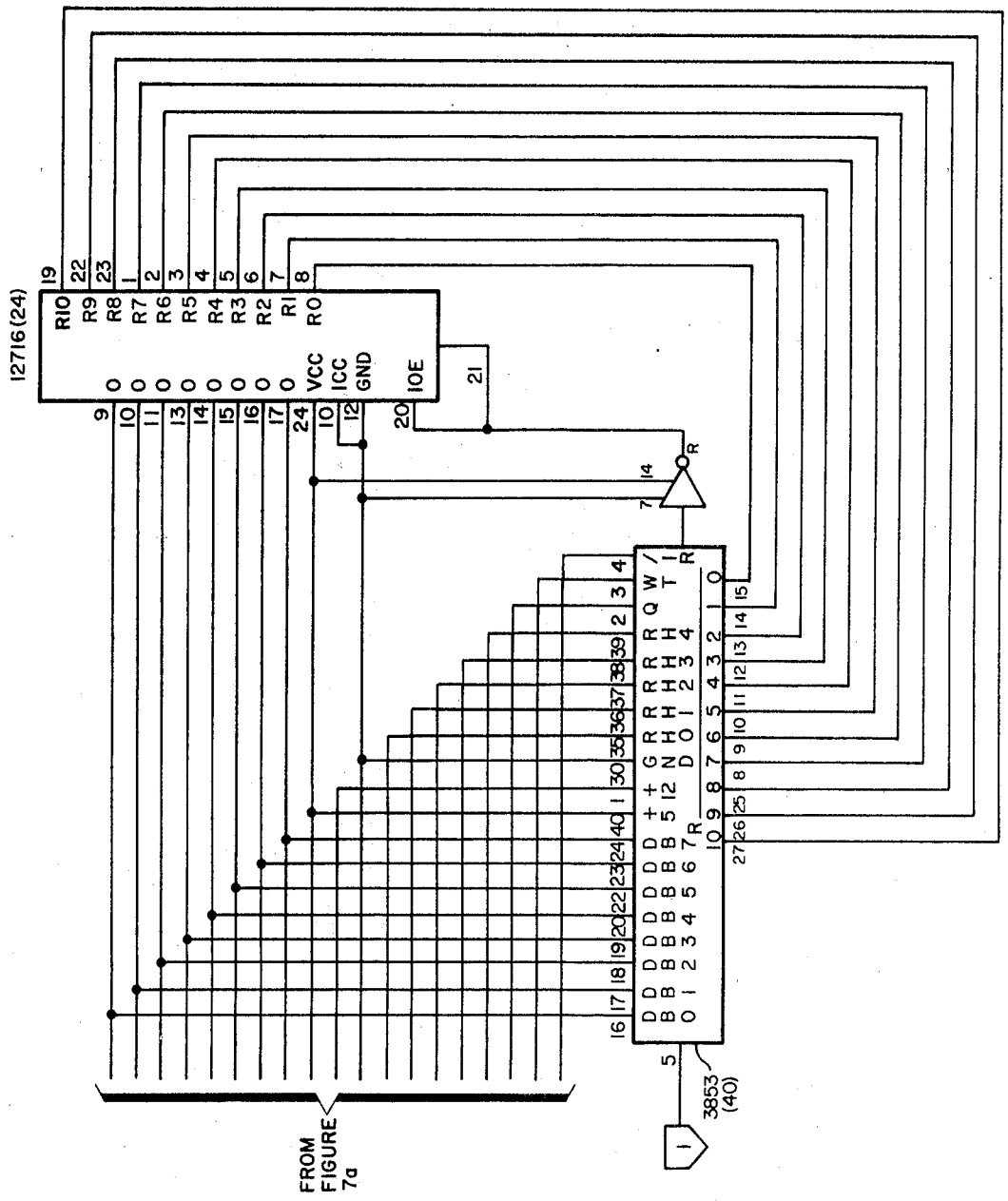
Figure 7C:
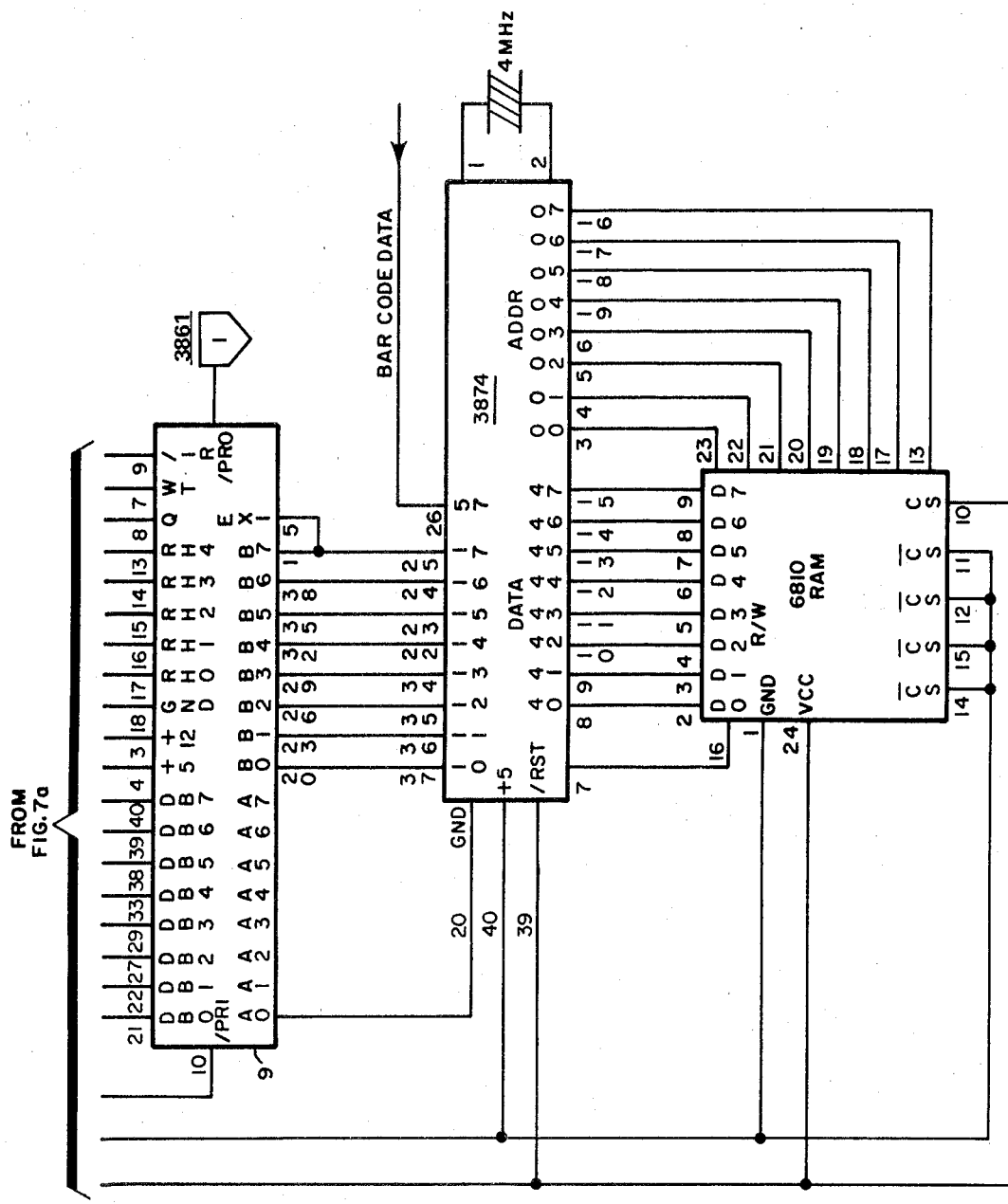

FIGS. 7a, 7b, and 7c are a microprocessor for reading the bar code format.

Figure 8A:
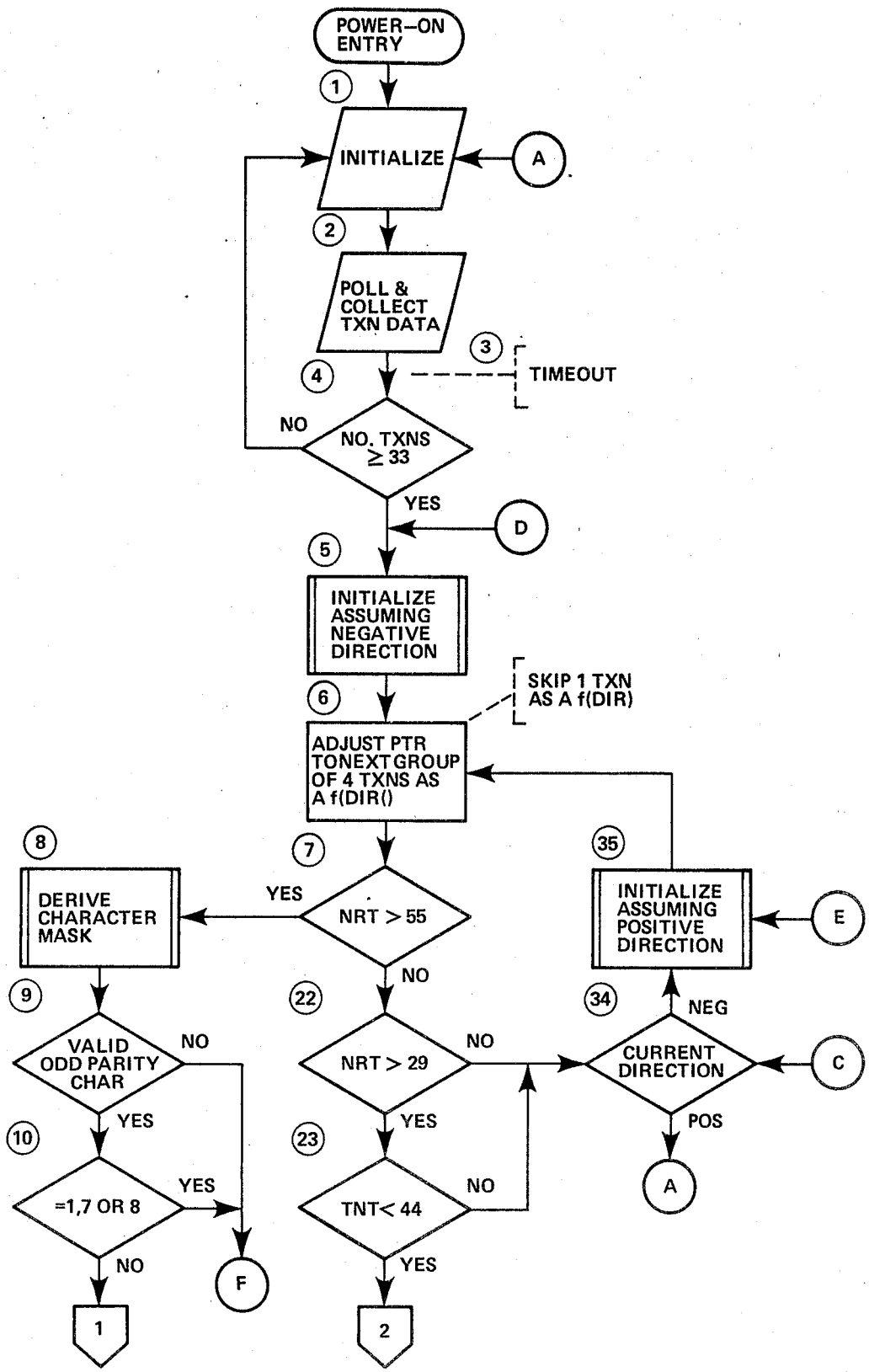
Figure 8B:
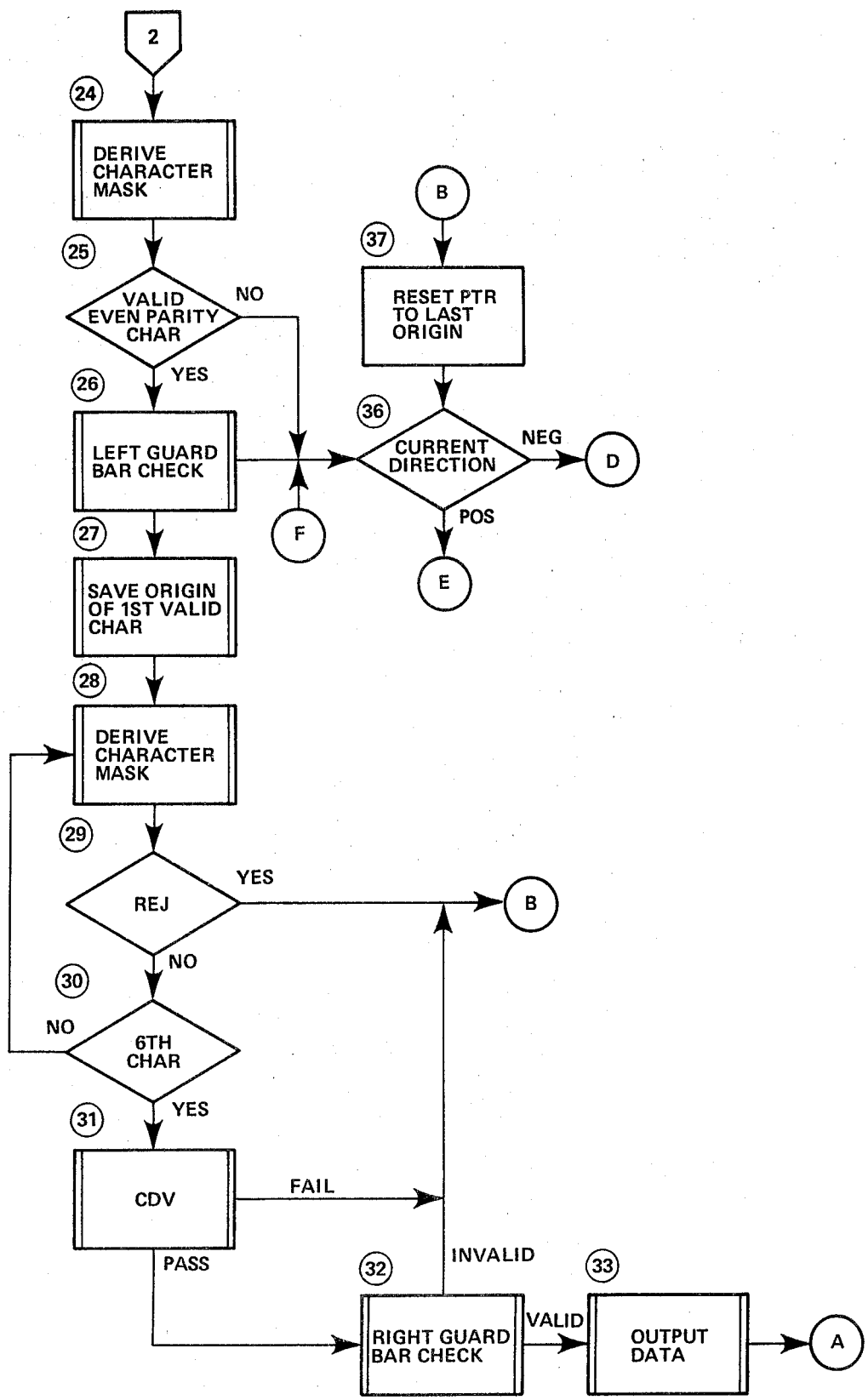
Figure 8C:
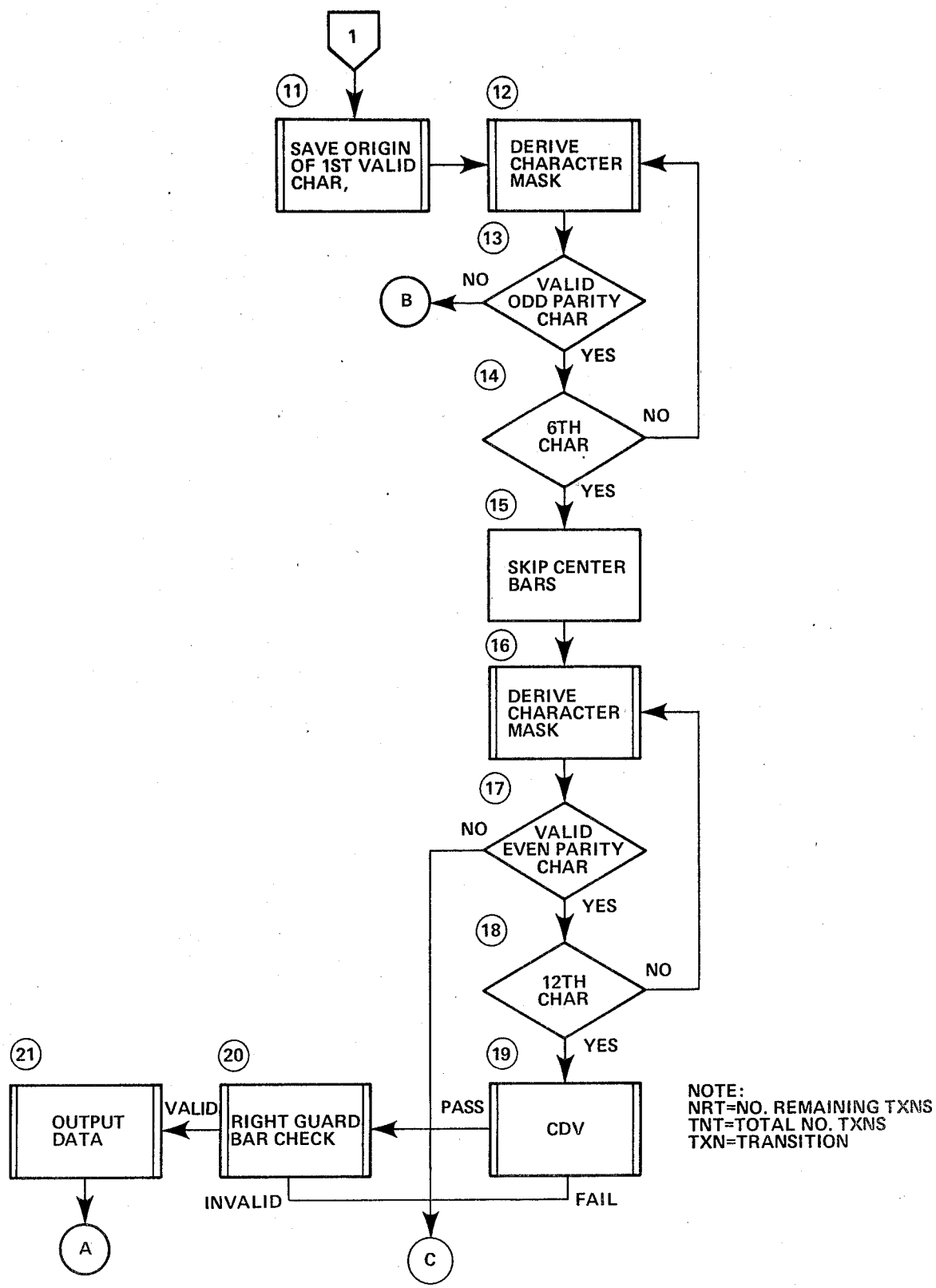

FIGS. 8a-8c comprise a flowchart of the UPC bar code reading process.

And tables 1, 2 and 3 illustrate the black/white decoding patterns for UPC bar code format.

PREFERRED EMBODIMENT

Figure 1:
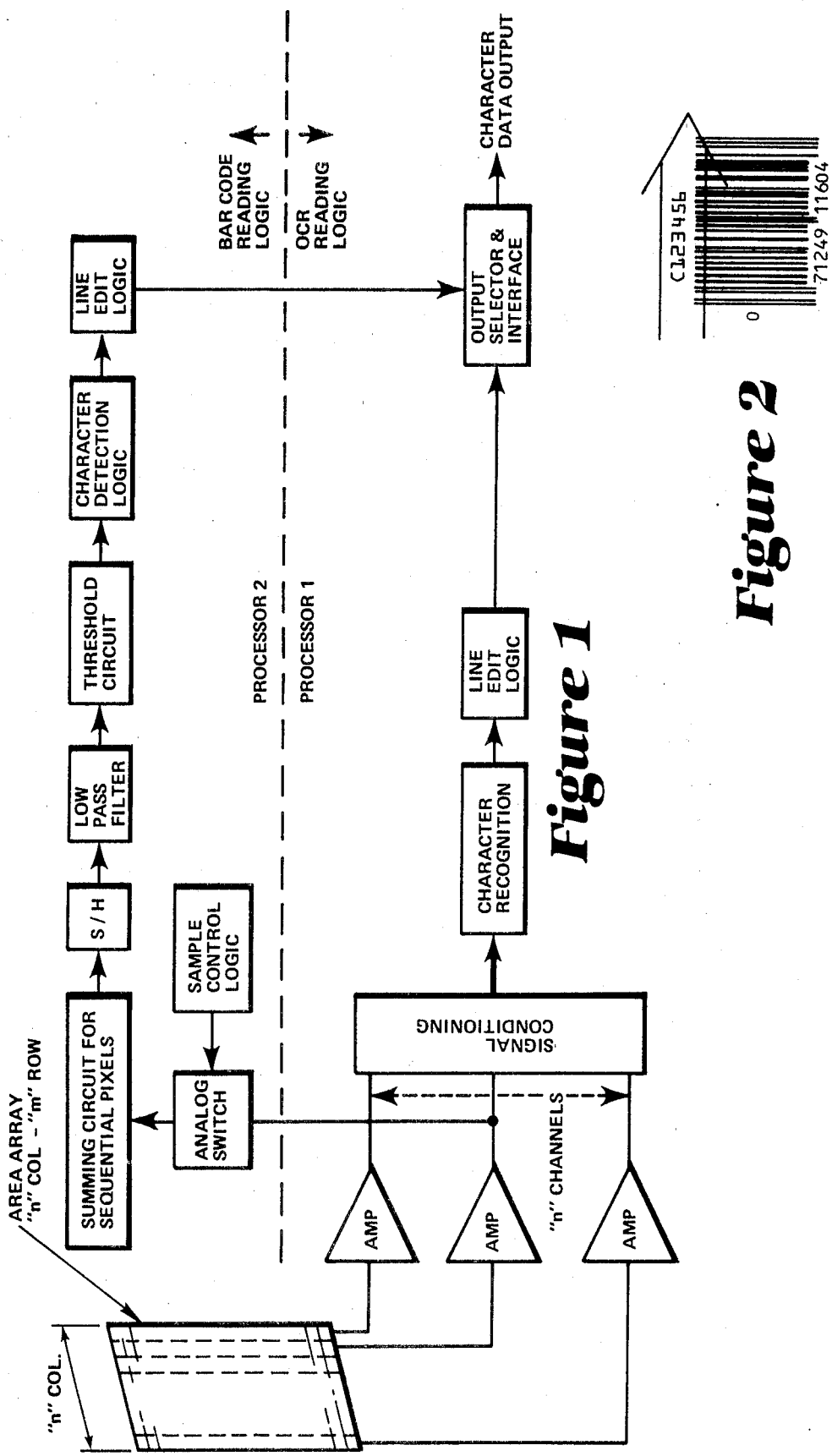
FIG. 1 is a block diagram of the dual reading optical character recognition system.

Illustrated in FIG. 1 is preferred embodiment of the bar code-alphanumeric reader. The scanning array is an N x M array having one or more N columns each column having M elements. The sequential output from each column is amplified and then applied to a signal conditioning circuit which applies the video therefrom to a character recognition unit. This character recognition unit may be similar to that described in and illustrated in U.S. Pat. No. 4,075,605.

The analog signal for the bar code reader, processor 2, takes the video out of only one column. In a milticolumn array the column selected is near the center of the array; however, if only one or two columns are used in a scanner then either the single or the right or left column may be utilized. The bar code analog signal is applied to analog switch which is under the control of the sample logic. The switch outputs the amplitude of the specific picture element within the self scanned sensor. This output constitutes the bar code sensing site and can consist of a single pixel or a column of several elements. Utilizing three or four picture elements will effectively result in having a rectangular shaped bar code sensor that will be tall and thin in the same orientation as the bars. This characteristic will reduce the effects of voids in the bars. The use of an analog switch to select specific picture elements allows a low percentage of modulation signal to be accommodated using low cost hardware. It is necessary to get accurate amplitude samples in order to construct a bar code signal that will reflect the correct bar widths.

The sample control logic samples signals from those picture elements which are near the center of the column of the array being used for reading bar codes.

From the analog switch the bar code signal is applied to the summing circuit for sequential picture elements. The function of the pixel summing circuit is to combine the outputs of the multiple samples to produce a signal equivalent to that which would be generated by an equivalent rectangular photosite. The cirucuit must respond to sequential inputs and retain the average value until a new set of samples is produced by the sensor.

Figure 3:
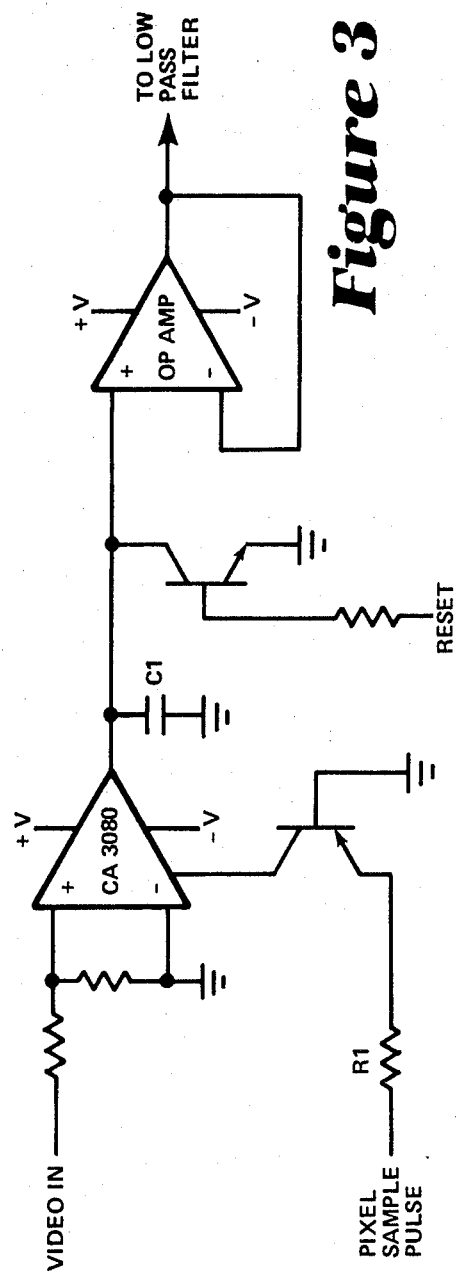
FIG. 3 is a circuit diagram combining the functions of analog gating summing of picture elements and sampling and hold.

A circuit which combines the function of analog gating, summing of picture elements, and sample-and-hold is illustrated in FIG. 3. The CA3080 circuit is an operational transconductance amplifier (OTA) that can be gated on and off. The pixel sample pulse enables the OTA which produces an output current proportional to the video signal amplitude and polarity. This current charges capacitor C1 producing a voltage which is the integral of the input video signal. Since the gating of the OTA is only during the desired pixel times, the voltage on C1 will be proportional to the average value of the pixels. This voltage level is buffered by the Operational Amplifier to drive the low pass filter circuit. Immediately before the next group of pixels are sampled, capacitor C1 is discharge to zero.

Figure 4:
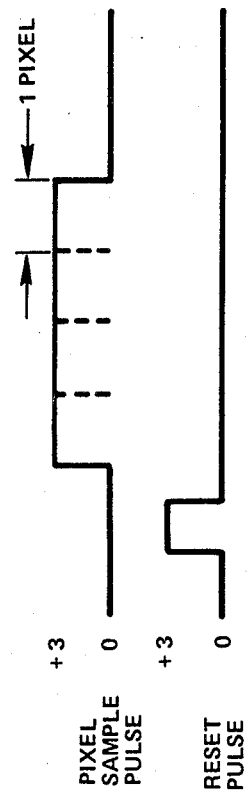
FIG. 4 illustrates wave forms from the circuit of FIG. 3.

The relative timing of the control pulses to operate the pixel summing circuit is illustrated in FIG. 4.

The minimum bar width and space pair represents the highest spatial information frequency. When this pattern is scanned by a sensor a signal frequency is obtained that will be in the range of 1500 Hz for a 30 IPS scan rate. The low pass filter is designed to pass data only up to this frequency; thus improving the signal-to-noise ratio of the signal before it is thresholded. The filter utilized for the low pass function is an active filter which implements a 3-pole, low ripple Chebyshev design.

Figure 5B:
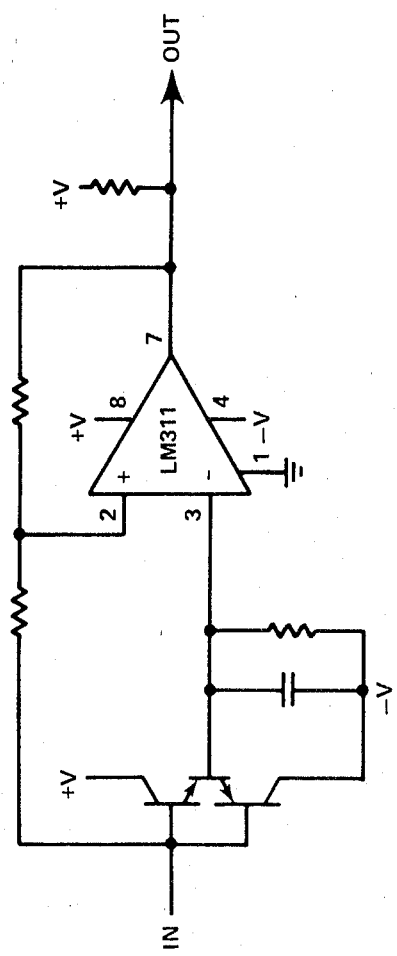
FIG. 5b is a circuit diagram of a thresholding circuit.
Figure 5A:
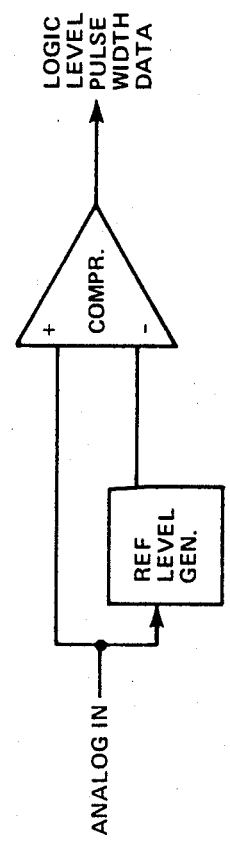
FIG. 5a is a block diagram of thresholding circuit.
Figure 6:
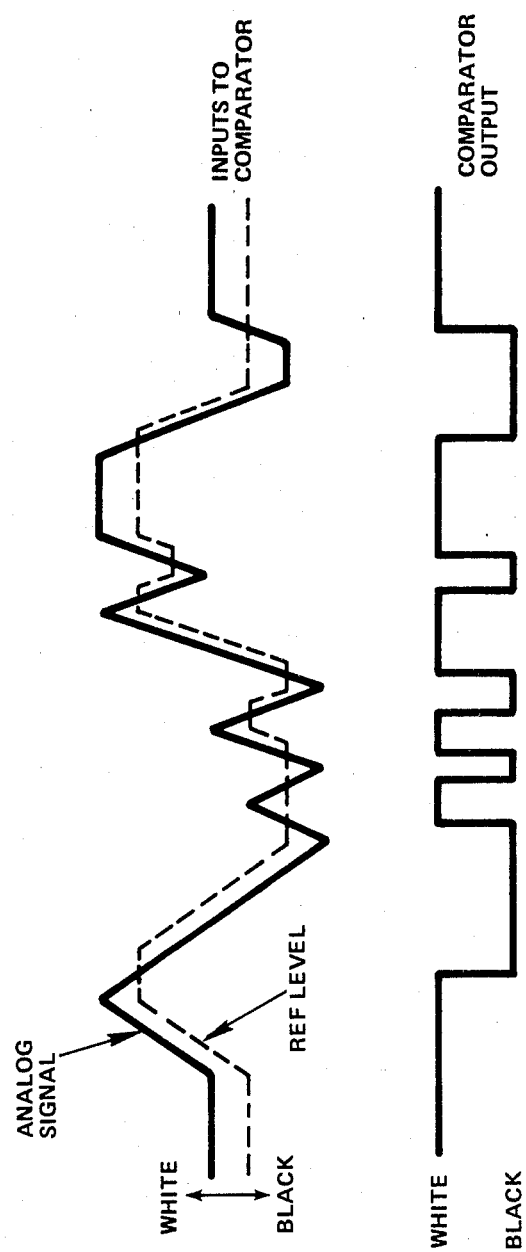
FIG. 6 illustrates the wave forms of the Video inputs and outputs of the comparator.

The function of the thresholding circuit is to transform the analog signal that is derived from optically scanning the bar code into a digital signal level whose pulse widths are representative of the widths of the bars in the bar code. The threshold circuit must accommodate a wide range of signal levels and modulation percentages in order to read a high percentage of tags or inventory codes. Because of this, an adaptive reference level must be used in thresholding the analog signal. FIG. 5a shows a block diagram of this approach. The circuit to accomplish this function is shown in FIG. 5b. The dynamic reference voltage is either 0.6 volts less than a positive peak or 0.6 volts greater than the negative peak. The peak values of the analog signal establish new reference levels for each signal swing and a black-to-white or white-to-black output transition occurs when the analog signal decreases from its peak value by 0.6 volts. Pulse widths will be accurate for waveforms that have equal positive and negative slopes and have peak to peak swings of 1.2 volts or greater. The waveforms shown in FIG. 6 represent a very poor analog input, but show the reference that would be produced and the resulting digital output. The output pulse widths are equal to the time between analog peaks or, in the case of a flat top signal, the time between positive to negative (or vice versa) directional changes. The comparator (FIG. 5a) is biased by the quiescent reference to produce a white output so that as the reader is brought closer to the paper no change in output occurs.

The chracter detection logic is implemented in the form of a 3874 8-bit microprocessor and is illustrated in FIG. 7. The microprocessor looks for black/white transitions on its input port 5-bit 7. The time intervals between black white transitions are then recorded in the microprocessor's memory. When the time between the black white transitions is long (i.e. widest bar width divided by minimum reading speed), the microprocessor then "times out" and goes to process the black white transitions for a valid bar code value.

In the case of the UPC code, each set of two black bars and two white bars represents digital character. The relative widths of the black and white determine which digital characters. The tables 1, 2 and 3 illustrate the decoding for UPC characters.

The velocity variations of a hand held device can be compensated for with this bar code due to the fact that each set of two black bars and two white bars compose 7 modules.
For:
$Tw$ = Time for white
$Tb$ = Time for black
$Tm$ = Time for 1/7 module
Then:
$W_{w1} = T_{w1}/Tm$
$W_{b1} = T_{b1}/Tm$
$W_{w2} = T_{w2}/Tm$
$W_{b2} = T_{b2}/Tm$
And:
$W_{w1} + W_{w2} + W_{b1} + W_{b2} = 7$
$W_{min} = 1$
$W_{max} = 4$ These characteristics can then be used to decode the black white transitions into decimal characters.

A flow chart of the UPC barcode reading process is shown in FIG. 8.

Step 1. The circuits and registers are initialized by power on clear circuits at initial power turn on. The time for the black and white bars and spaces is recorded in memory during Step 2. If a period of time has passed which is greater than the widest bar or space divided by the lowest expected reader velocity, and no black to white or white to black data transition has occurred, then a time out condition is generated at Step 3. If fewer than 33 transitions of black to white and white to black have occurred at Step 4, then it is impossible for a full UPC barcode to have been read. The process is reinitialized to Step 1.

With 33 or more transitions of black to white and white to black it is possible that a valid UPC barcode has been scanned and the process advances to Step 5 where an initial guess of a right to left scan of the reader over the barcode is assumed.

At Step 6 the collected data from Step 2 is looked at as groups of 2 bars and two spaces since all valid numbers are so grouped as shown in Table 1. If the number of transitions is greater than 55, then the process assumes a twelve digit long code version the UPC barcode at Step 7, and proceeds to Step 8 where the mask for the four bars is derived by using the equations:
$W_{w1} + W_{w2} + W_{b1} + W_{b2} = 7$ and
$W_{min} = 1$
$W_{max} = 4$ The sum of the widths of the two black ($W_{bx}$) bars and two white spaces ($W_{wx}$) is 7 units and the minimum width is one and the maximum width is four.

In Step 9 the character mask or pattern is checked against the odd parity characters of Table 3. If a valid character is found, then the decision goes to Step 10 where the first valid odd parity character is compared to the numbers one (1), seven (7) and eight (8). These numbers are excluded since in the 12 digit UPC, the first left hand digit cannot be one, seven or eight. The negative leg of Step 9 and the positive leg of Step 10 will be discussed later as they indicate a good start character for the 12 digit UPC code has not been derived yet.

Step 11 indicates that the first valid left hand odd parity character of the 12 digit UPC code has been found and its place in the input data stream is marked and the next two sets of black and white bars are indexed for the character mask derivation in Step 12. This is the same process as described in Step 8. If this character mask corresponds to a valid odd parity character in Step 13, then this character is stored away and the input stream reindexed to next two sets of black and white bars. If less than six characters have been found, then Steps 12 and 13 are repeated by the decision at Step 14.

After 6 characters have been found by repeating Steps 12 and 13, the bar code format expects a center bar pattern as shown in Table 1. Step 15 skips over this center bar pattern. Step 16 looks at two more sets of bars and spaces as was done in Step 8. Since the right hand side of the 12 digit UPC code is even parity, Step 17 looks for valid even parity digits from the complement of the odd parity of Table 3. This process continues until six even parity digits are found, thus making a total of 12 character as indicated in Step 18. When the 12th character is found, a check digit is calculated over the 12 characters in Step 19, and if the check digit calculates properly the right guard bars are validated in Step 20 against the pattern shown in Table 1.

When all of these checks, as outlined above, are passed, the digits for the validated bar code data are output in Step 21 to the output selector and interfaceed as shown in FIG. 1a. The steps as outlined above for Steps 8 through 21 was for a 12 digit UPC barcode reading the data out from left to right as it appears on the page. The actual scanned direction was compensated for in Steps 5 or 35.

Now returning to Step 7 and taking the "no leg", this part of the flow chart is basically for the E version (6 digit) UPC code. At Step 22 if the number of transitions (bars and spaces) is less than 29, then this is insufficient for a valid 6 digit barcode and the process goes to Step 34 to try the opposite direction, if it has not already been tried. At Step 23 the number of transitions is checked to be less than 44. If this test is passed then Step 24 uses a set of two bars and two spaces to derive a character mask as was done in Step 8. Since at the present time only number system zero from Table 2 is used, then this first character must be even parity. This check is done in Step 25.

If a valid first left character for the 6 digit UPC barcode is found, the input pointer is backed up three transitions and the left guard bar is checked for the pattern shown in Table 1. This is Step 26 of the process. If the left guard bar is validated then the location of the first valid character is recorded in Step 27. The pointer is moved to the next set of two black and two white bars and the character mask is derived in Step 28 as it was in Step 8.

In Step 29 the character mask is compared to Table 3 for a match of the odd or even parity digits. If a match is found, not a reject, the character and parity is stored and the process of Step 28 and 29 is repeated until six characters are found in Step 30. When the six characters have been found, Step 31 compares the check digit with the character parity shown in Table 2. If this check digit calculation passes, then in Step 32, the right guard bars, as shown in Table 1, are validated. If this validation passes then the data is output in Step 33 as it was in Step 21. This thus completes the successful decode of a six character UPC barcode.

Returning to Step 34 which is entered from Steps 20, 22 or 23. These indicate a failure of the decode process in the initial assumed negative direction. This in Step 34 if the present direction is negative, then the positive direction is assumed in Step 35 and the process restarts at Step 6 for another look in the opposite direction. If, in Step 34, the previous direction was positive, that implies Step 35 has already been tried before so the process aborts having not found a valid barcode in either direction.

Step 36 is a result of a failure in Steps 9, 10, 25, 26 or 37. In this case if the direction was positive or negative the pointer is moved one bar or space in the previously defined direction and the process tried over again at Step 6.

Step 37 is a result of a failure in Steps 13, 29, 31 or 32. In this case the pointer to the input data stream must be replaced to its previous origin before the one bar or space adjustment is made in the proper direction.

The UPC bar code is further protected with stop/start bars, center bars, right and left of center bars and overall parity check characters.

These are generally illustrated in table 1. Other black/white bar codes have similar properties and can be decoded by recording the time length of the black/white bars and using appropriate decoding equations.

The line edit logic is performed by a 3874 Microprocessor. The digits as determined in the character detection logic are checked as to direction of scan, digit parity, and line parity. In the case of the UPC bar code, the number of black elements (not bars) per digit determine the character parity (000 is left hand bars; even is right hand bars). The line parity is determined by a weighting scheme of the first eleven characters to determine the twelfth character.

These checks, coupled with right hand, center, and left hand guard bars are used to provide bar code line data integrity.

When the bar code field has passed all of the above tests for data integrity, the data is transferred to the output selector and the interface.

Figure 2:
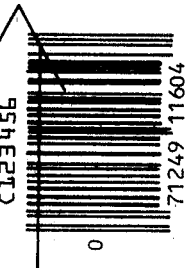
FIG. 2 illustrates both alphanumeric and bar code format.

Processor 1 may be similar to that described in U.S. Pat. Nos. 4,075,605 and 4,118,687 and is not further described here. The output selecting an interface which is fed by both the alphanumeric and the bar code processors gives priority to an output from processor 1 if there is no output in processor 1 and there is output in processor 2 then the character data output data is from processor 2. In practice there would only be an output from both processors if the units scanned as illustrated FIG. 2 covering the alphanumeric characters and the bar code otherwise, there would only be an output from one of the processors and the decision does not have to be made.

While specific examples have been given of a combination bar code/alphanumeric reader which will read either of the formats without interference from the operator other examples will be apparent to those skilled in the art having seen these specific examples and the attached claims.

What is claimed:

1. An optical reader for reading alphanumeric and bar code characters using a single area array of photo sensitive diodes wherein there are at least two columns in the array and each column has a plurality of photo sensitive diodes such that the column exceeds in length the height of the character being read, comprising; means for reading the electrical signals for each photo diode in a column sequentially, means for reading the sequential electrical signals for each column in parallel with the signals in all the columns, means for selecting part of the signals from one of the columns and summing the selected signals for one or more scans to identify therefrom bar code characters being scanned, means for utilizing electrical signals from all of the columns to identify alphanumeric characters being scanned, and mdeans to identify which type of character is being read, bar code or alphanumeric, and out putting signals representative of the read characters.

2. The reader according to claim 1, including means to combine said part of the signals from one of the columns to produce a signal equivalent to one which would be produced by an equivalent rectangular photo diode.

* * * * *